United States Patent
Boulant

(10) Patent No.: US 7,491,332 B2
(45) Date of Patent: Feb. 17, 2009

(54) METHOD AND DEVICE FOR PHYSICAL AND BIOLOGICAL TREATMENT OF BIOMASS

(75) Inventor: Alain Christian Michel Guy Boulant, Pornichet (FR)

(73) Assignee: Carbofil France, Saint Mars la Jaille (FR)

( * ) Notice: Subject to any disclaimer, the term of this patent is extended or adjusted under 35 U.S.C. 154(b) by 0 days.

(21) Appl. No.: 11/577,306

(22) PCT Filed: Oct. 14, 2005

(86) PCT No.: PCT/FR2005/002560

§ 371 (c)(1),
(2), (4) Date: Apr. 13, 2007

(87) PCT Pub. No.: WO2006/042951

PCT Pub. Date: Apr. 27, 2006

(65) Prior Publication Data

US 2007/0267347 A1    Nov. 22, 2007

(30) Foreign Application Priority Data

Oct. 15, 2004  (FR)  ................................... 04 10897

(51) Int. Cl.
*C02F 3/00* (2006.01)
(52) U.S. Cl. ........................ 210/610; 210/624; 210/625; 435/173.7
(58) Field of Classification Search ................. 210/610, 210/624, 625; 435/173.7
See application file for complete search history.

(56) References Cited

U.S. PATENT DOCUMENTS

| 6,305,913 B1 | 10/2001 | Hashish et al. |
| 6,444,124 B1 * | 9/2002 | Onyeche et al. ............. 210/603 |

FOREIGN PATENT DOCUMENTS

| DE | 19842005 | 3/2000 |
| FR | 2687590 | 8/1993 |
| JP | 2002045883 | 6/2002 |
| WO | 0007946 | 2/2000 |
| WO | 0116037 | 3/2001 |
| WO | 2004050566 | 6/2004 |

OTHER PUBLICATIONS

International Search Report dated Feb. 1, 2006.
Preliminary Search Report dated Apr. 13, 2005 with English translation.

* cited by examiner

*Primary Examiner*—Chester T Barry
(74) *Attorney, Agent, or Firm*—Dickinson Wright, PLLC

(57) ABSTRACT

A method for the physical and biological treatment of an organic effluent, which is decomposed by microorganisms in a biological treatment zone, includes recovering a fraction of the biomass derived from the biological treatment, filling a compression reservoir with the biomass fraction, isolating the compression reservoir, and subjecting the filled compression reservoir to a very high pressure so to destroy or damage the microorganisms in the biomass fraction. Thereafter, the compression reservoir is returned to atmospheric pressure and the treated biomass fraction is reinjected into the biological treatment zone or into another biological treatment zone.

14 Claims, 3 Drawing Sheets

METHOD AND DEVICE FOR PHYSICAL AND BIOLOGICAL TREATMENT OF BIOMASS

FIELD OF THE INVENTION

The present invention relates to a method for the physical and biological treatment of a biomass and to a device for carrying out said method.

BACKGROUND OF THE RELATED ART

As is known per se, effluents of urban, industrial and agricultural origin can be treated biologically using suitable microorganisms (bacteria, etc.) that may or may not be naturally present in these effluents.

The principle of a biological treatment is to convert the organic effluents into carbon dioxide and water, with heat being given off. This principle enables a loss of matter.

Thus, during the biological treatment, the microorganisms feed on the organic effluents, allowing decomposition of the latter. The amount of microorganisms (also called biomass or biological sludge) increases as the degradation of the organic effluents progresses.

Depending on the type of biological treatment used, a more or less substantial, but always non negligible, amount of biomass remains.

This biomass constitutes waste for which the costs of exploitation (agricultural, etc.) or of elimination (incineration, etc.) are increasingly high.

During a biological treatment, the degradation of the biomass is generally carried out using natural ageing of the microorganisms (25 to 30 days).

Said microorganisms that have died naturally are assimilated (consumed) by younger microorganisms. At each cycle, the amount of matter will be reduced, with production of carbon dioxide, water and heat.

One technique for reducing the production of biomass consists in reducing the lifecycle of the microorganisms by carrying out destruction thereof.

One destruction technique consists in subjecting these microorganisms to high pressures, in processes of the continuous flow type, such as those taught by documents WO 01/016037 and WO 00/07946. This destruction is, in practice, incomplete.

SUMMARY OF THE INVENTION

Thus, the main aim of the present invention is to provide means for completing the destruction of a biomass. Another aim of the present invention is to convert the pathogenic or undesirable microorganisms into ordinary microorganisms. These pathogenic microorganisms may be present, for example, in the effluents from pharmaceutical industries, in the effluents from hospitals, etc.

These aims of the invention are achieved with a method for the physical and biological treatment of an organic effluent whereby said effluent is decomposed by means of microorganisms in at least one biological treatment zone, in which method:

a) a fraction of the biomass derived from said biological treatment is recovered,
b) a compression reservoir is filled with this biomass fraction,
c) this compression reservoir is isolated,
d) this compression reservoir is subjected to a very high pressure (with or without the presence of gas) so as to destroy or damage the microorganisms in said fraction,
e) this compression reservoir is allowed to return to atmospheric pressure, and
f) said fraction thus treated is reinjected into said biological treatment zone, or into one or more other biological treatment zones.

Unlike the methods of the prior art, the method according to the present invention is a batchwise method, which makes it possible to confine each biomass batch and to take it to pressures that are much higher than in the prior art. A much more effective destruction of the microorganisms is thus obtained.

According to other optional characteristics of this method:
said biological sludge fraction is subjected to a pressure of between 380 and 10000 bar, with or without gas,
the succession of steps a) to f) is carried out several times,
between steps a) and b), said biomass fraction is thickened.

The present invention also relates to a compression reservoir for carrying out a method in accordance with the above, comprising a high-mechanical-strength body, closed at two ends by means of two plugs, wherein sealing means are provided so as to ensure sealed closure of this body by these plugs, wherein, firstly, inlet or outlet means for said biomass fraction pass through each plug, wherein gate means are provided in order to selectively close off said inlet or outlet means, and wherein means for injecting a liquid under very high pressure pass through at least one of the two plugs.

According to other optional characteristics of this compression reservoir:
said gate means comprise gates and gate seats maintained by said plugs,
said sealing means comprise seals at the periphery of the gate seats, and wedges tightened by said plugs so as to exert a radial support force against said seats,
said gates are mounted on actuating tubes inside which said liquid can circulate.

The present invention also relates to a device for carrying out a method in accordance with the above, which is notable in that it comprises:
a biological treatment zone,
a compression reservoir in accordance with the above,
means for sending said biomass fraction from said treatment zone into said compression reservoir,
means for subjecting said compression reservoir to a very high pressure, and
means for sending said biomass fraction from said compression reservoir to said treatment zone or to another biological treatment zone.

According to other optional characteristics of this device:
said means for subjecting to a very high pressure comprise a pump plugable of generating a pressure of between 380 and 10000 bar, with or without gas,
this device comprises a thickening system interposed between said treatment zone and said sending means.

BRIEF DESCRIPTION OF THE DRAWINGS

In order to illustrate the present invention as clearly as possible.

DETAILED DESCRIPTION OF THE INVENTION

Figure 1:
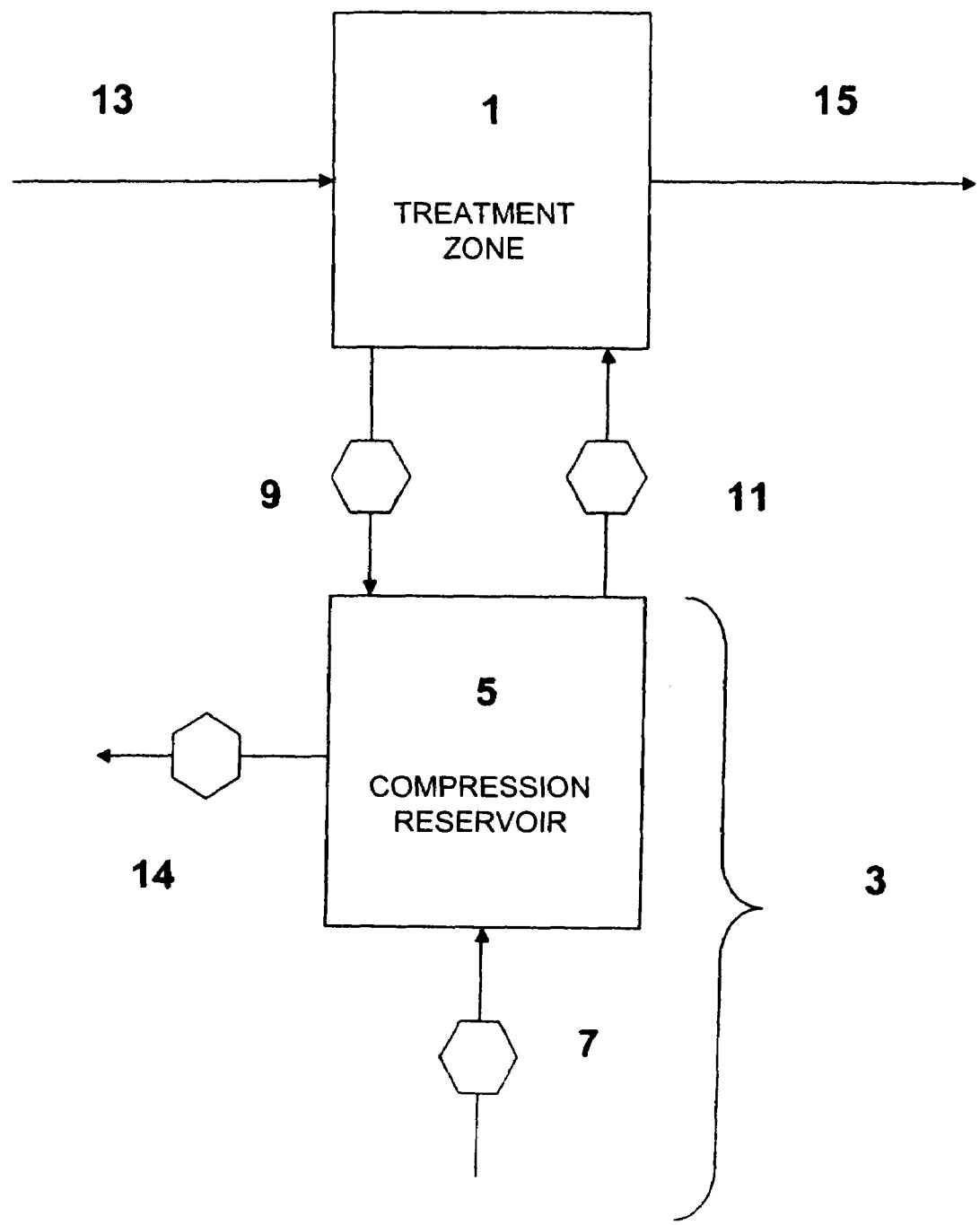
FIGS. 1 and 2 attached hereto represent, schematically, two examples of devices for carrying out the method according to the invention.

As can be seen in FIG. 1, this device can comprise a treatment zone 1 that can consist typically of a biological reactor (such as that taught by French patent application no. 97 00116).

This device comprises, moreover, a cell disintegrator 3 comprising a compression reservoir 5 and a pressurizing system 7 in fluid communication with this reservoir.

The pressurizing system 7 can comprise a very high pressure pump plugable of generating, inside the reservoir 5, a pressure of between 380 and 10000 bar.

This reservoir 5 is itself in fluid communication with the treatment zone 1, firstly, by means of a feed system 9 and, secondly, by means of an evacuation system 11.

In 13, an organic effluent to be treated is introduced into the biological treatment zone 1. The biological treatment zone 1 contains microorganisms plugable of degrading the organic effluent.

The biological degradation process is then allowed to take place inside the treatment zone 1.

This being so, the feed system 9 is turned on so as to fill the compression reservoir 5 with a biomass fraction located in the treatment zone 1.

When the reservoir 5 has been filled, it is isolated and the pressurizing system 7 is turned on so as to pressurize the reservoir 5.

Under the effect of this increase in pressure, the membranes of the microorganisms in the reservoir 5 are damaged or rupture, thus converting these microorganisms into simple inert organic matter.

Once this operation has been carried out, the pressurizing system 7 is turned off and the organic matter in the reservoir 5 is allowed to return to ambient pressure by means of a system for subjecting to atmospheric conditions 14.

After this, the evacuation system 11 is turned on so as to send this biological matter into the treatment zone 1 or to another treatment zone, All these operations are repeated as many times as necessary.

As can be understood in light of the above, the fact of subjecting a biomass fraction to a very high pressure in a confined chamber makes it possible to very effectively destroy or damage the membranes of the microorganisms in this fraction, and these microorganisms therefore find themselves reduced to the state of simple inert organic matter.

When this inert organic matter is injected into a biological treatment zone, it will serve as food for the other microorganisms that are alive.

By consuming this inert organic matter, said other microorganisms convert it essentially to proteins required for their growth, and also to carbon dioxide, to water which is discarded into the biological treatment zone, and heat.

Thus at each cycle, the overall mass of the biomass is reduced.

Of course, the present invention is not limited to the embodiment described above and illustrated by FIG. 1. This embodiment is given by way of nonlimiting illustration.

Thus, it is, for example, possible to recover the biomass fraction extracted from the biological treatment zone 1 in a thickening system 17 (see FIG. 2) before sending it into the compression reservoir 5 of the cell disintegrator 3.

By removing part of the water from the biomass, this makes it possible to send, into the cell disintegrator, a maximum of microorganisms for the same volume.

Figure 3:
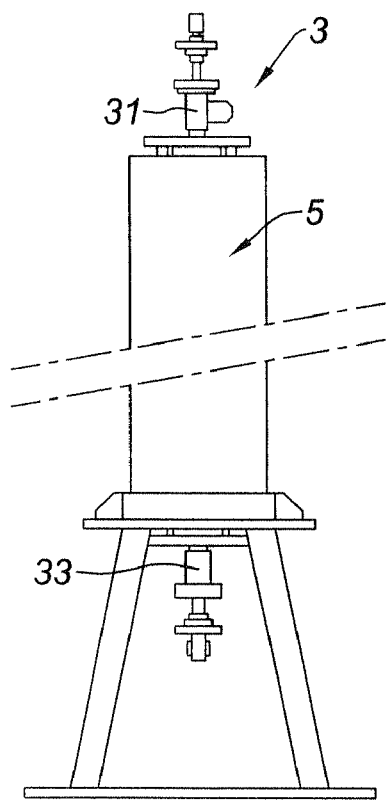
FIGS. 3 and 4 are, for their part, views, respectively in elevation and in axial section, of a cell disintegrator that can be part of the devices of FIGS. 1 and 2.
Figure 4:
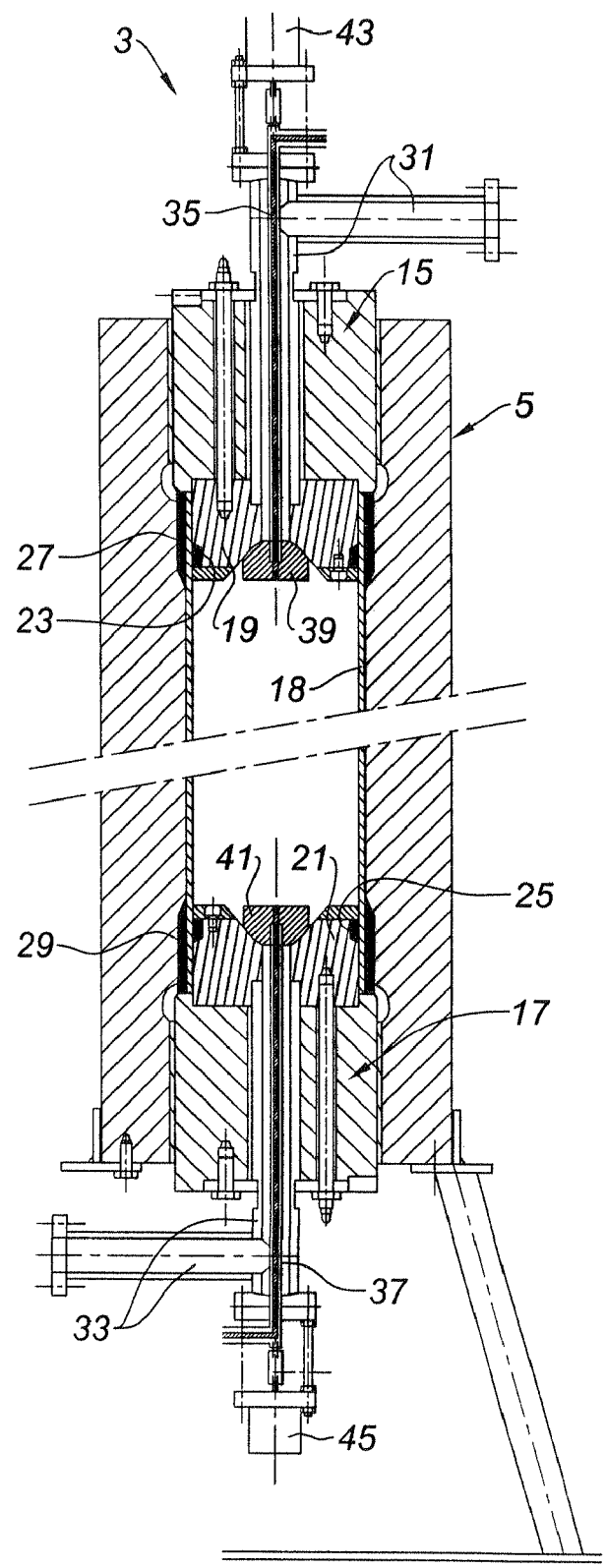

FIGS. 3 and 4 represent, purely by way of illustration, an example of a cell disintegrator 3 that may be suitable in the context of the present invention.

This disintegrator comprises a compression reservoir 5, in the shape, for example, of a cylinder, made of a high-mechanical-strength material such as steel.

The compression reservoir 5 is closed at its two ends by means of plugs 15, 17 made, for example, of steel and screwed into the reservoir 5 by means of suitable screwthreads.

The inside face of the reservoir 5 preferably comprises a stainless steel lining 18.

Attached to the face of each plug located on the inner side of the reservoir 5 is a gate seat 19, 21.

Between each gate seat 19, 21 and the stainless steel liner 18 of the reservoir 5 is a very high pressure seal 23, 25.

Between the inside face of the reservoir 5 and the liner 18 are two wedge pieces 27, 29, on which the plugs 15, 17 exert axial support forces, by virtue of which the liner 18 is pushed against the seals 23, 25, thus reinforcing the sealing of the reservoir 5.

An inlet pipe 31 or outlet pipe 33 for the biomass fraction to be treated passes through each plug 15, 17 and each gate seat 19, 21, these pipes being connected, respectively, to the feed system 9 and the evacuation system 11.

Inside the pipes 31, 33 are hollow tubes 35, 37 at the end of which are gates (or valves) 39, 41, these gates themselves having these hollow tubes passing through them.

Figure 2:
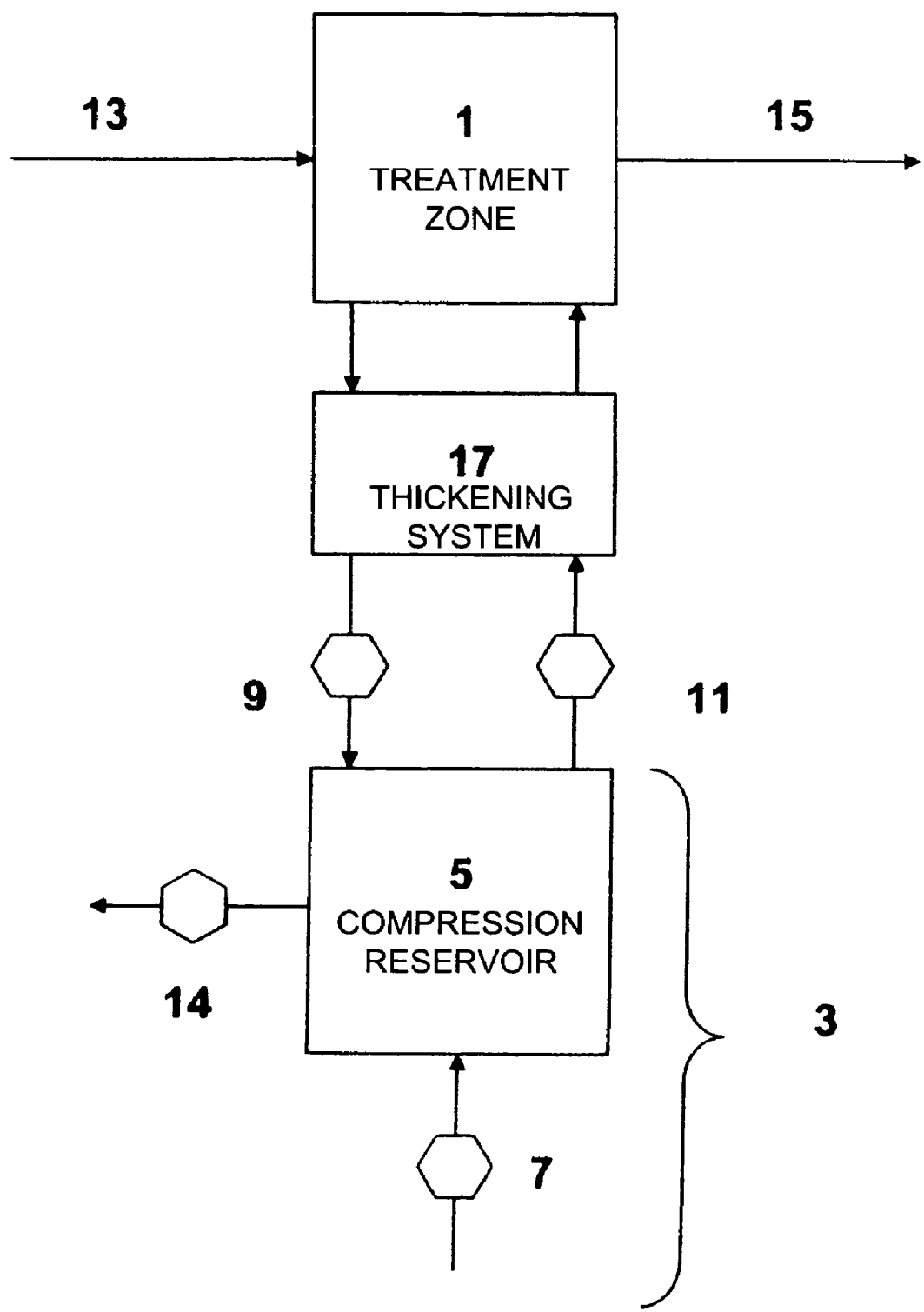

These hollow tubes can be fed with liquid at very high pressure (such as water) by means of the pump 7 (see FIGS. 1 and 2).

These hollow tubes can also make it possible to subject the reservoir 5 to atmospheric conditions by means of a valve for subjecting to atmospheric conditions 14 (see FIGS. 1 and 2). In addition, it is possible to envision connecting sensors for measuring pressure and for taking samples, to these hollow tubes.

In addition, these tubes 35, 37 can be actuated axially by means, for example, of screwjack drives 43, 45, by virtue of which the gates 39, 41 can move away from or push against their respective seats 19, 21, thus making it possible to selectively bring the reservoir 5 into communication with the pipes 31, 33 (and therefore, in particular, to bring this reservoir into contact with air), or to close this reservoir.

In order to fill the cell disintegrator 3, the two gates 39, 41 are opened, which makes it possible to cause the biomass fraction which has just been treated to be flushed, via the pipe 33, by the biomass fraction to be treated, which enters via the pipe 31.

The two gates 39, 41 are then closed and liquid is injected, under very high pressure, via one of the two tubes 35, 37, which causes destruction of the microorganisms of the biomass fraction in the process of being treated.

After this, the gate 39 is gradually opened so as to cause the reservoir 5 to return to atmospheric pressure, and the next cycle can be recommenced.

What is claimed is:

1. A method for the physical and biological treatment of an organic effluent whereby said effluent is decomposed by microorganisms in at least one biological treatment zone, characterized in that:
    a) a fraction of the biomass derived from said biological treatment is recovered,
    b) a compression reservoir is filled with this biomass fraction,
    c) this compression reservoir is isolated, d) this compression reservoir is subjected to a very high pressure (with or without the presence of gas) so to destroy or damage the microorganisms in said biomass fraction, e) this compression reservoir is allowed to return to atmospheric pressure, and f) said biomass fraction thus treated is reinjected into said biological treatment zone, or into one or more other biological treatment zones.

2. The method as claimed in claim 1, in which said biomass fraction is subjected to a pressure of between 380 and 10 000 bar, with or without gas.

3. The method as claimed in claim 1, in which the succession of steps a) to f) is carried out several times.

4. The method as claimed in claim 2, in which the succession of steps a) to f) is carried out several times.

5. The method as claimed in claim 1, in which, between steps a) and b), said biomass fraction is thickened.

6. A compression reservoir for carrying out a method in accordance with claim 1, comprising a high-mechanical-strength body, closed at two ends by two plugs delimiting a compression chamber, wherein sealing devices are provided so as to ensure sealed closure of this chamber by these plugs, wherein, an inlet or outlet for said biomass fraction into or out of said chamber pass through each plug, wherein gate devices are provided in order to selectively close off said inlet or outlet, and wherein an injector for injecting a liquid under very high pressure into said chamber passes through at least one of the two plugs.

7. The reservoir as claimed in claim 6, in which said gate devices comprise gates and gate seats maintained by said plug.

8. The reservoir as claimed in claim 7, in which said sealing devices comprise seals at the periphery of the gate seats, and wedges tightened by said plugs so as to exert a radial support force against said seats.

9. The reservoir as claimed in claim 7, in which said gates are mounted on actuating tubes inside which said liquid can circulate.

10. The reservoir as claimed in claim 8, in which said gates are mounted on actuating tubes inside which said liquid can circulate.

11. A device for carrying out a method for the physical and biological treatment of an organic effluent whereby said effluent is decomposed by microorganisms in at least one biological treatment zone, characterized in that:

a) a fraction of the biomass derived from said biological treatment is recovered, b) a compression reservoir is filled with this biomass fraction, c) this compression reservoir is isolated, d) this compression reservoir is subjected to a very high pressure (with or without the presence of gas) so to destroy or damage the microorganisms in said fraction, e) this compression reservoir is allowed to return to atmospheric pressure, and f) said fraction thus treated is reinjected into said biological treatment zone, or into one or more other biological treatment zones, said device comprising:

the biological treatment zone, the compression reservoir, a first sending component that sends said biomass fraction from said treatment zone into said compression reservoir, a pressurizing device that subjects said compression reservoir to the very high pressure, and a second sending component that sends said biomass fraction from said compression reservoir to said treatment zone or to the other biological treatment zone.

12. The device as claimed in claim 11, wherein:

said pressurizing device comprises a pump that generates a pressure of between 380 and 10,000 bar, with or without gas, and said pressurizing device subjects said biological sludge fraction to a pressure of between 380 and 10,000 bar.

13. The device as claimed in claim 11, further comprising a thickening system interposed between said treatment zone and said first and second sending components.

14. The device as claimed in claim 12, further comprising a thickening system interposed between said treatment zone and said first and second sending components.

* * * * *